(12) United States Patent
Cheng et al.

(10) Patent No.: US 10,013,709 B2
(45) Date of Patent: Jul. 3, 2018

(54) TRANSFORMING A BASE MULTI-TENANT CLOUD TO A WHITE LABELED RESELLER CLOUD

(71) Applicant: INTERNATIONAL BUSINESS MACHINES CORPORATION, Armonk, NY (US)

(72) Inventors: HaiXu Cheng, Beijing (CN); Kapu Veera R. Reddy, Bangalore (IN); Sreekrishnan Venkiteswaran, Ernakulam (IN)

(73) Assignee: International Business Machines Corporation, Armonk, NY (US)

(*) Notice: Subject to any disclaimer, the term of this patent is extended or adjusted under 35 U.S.C. 154(b) by 719 days.

(21) Appl. No.: 14/596,858

(22) Filed: Jan. 14, 2015

(65) Prior Publication Data
US 2016/0203533 A1    Jul. 14, 2016

(51) Int. Cl.
  G06Q 30/06    (2012.01)
  H04L 29/06    (2006.01)
  G06Q 30/04    (2012.01)
  H04L 12/58    (2006.01)

(52) U.S. Cl.
  CPC ......... *G06Q 30/0601* (2013.01); *G06Q 30/04* (2013.01); *H04L 51/24* (2013.01); *H04L 63/083* (2013.01)

(58) Field of Classification Search
  CPC .................................................... G06Q 30/06
  USPC ....................................................... 705/26.1
  See application file for complete search history.

(56) References Cited

U.S. PATENT DOCUMENTS

| | | | | |
|---|---|---|---|---|
| 8,509,226 | B1* | 8/2013 | Murphy | H04L 12/6418 370/352 |
| 2012/0131591 | A1* | 5/2012 | Moorthi | G06Q 10/06 718/104 |
| 2012/0290460 | A1 | 11/2012 | Curry, Jr. et al. | |
| 2013/0031028 | A1 | 1/2013 | Martin | |
| 2013/0111027 | A1 | 5/2013 | Milojicic et al. | |
| 2014/0064154 | A1 | 3/2014 | Hunt et al. | |
| 2014/0101013 | A1 | 4/2014 | Baset et al. | |

(Continued)

OTHER PUBLICATIONS

Cloud CMS—Features; Cloud Content Management [online]; [retrieved on Jul. 2, 2014; Retrieved from the Internet URL: <https://www.cloudcms.com/tour/platform/multitent>; 8 pages.

(Continued)

*Primary Examiner* — Mila Airapetian
(74) *Attorney, Agent, or Firm* — Schmeiser, Olson & Watts; John Pivnichny

(57) ABSTRACT

An approach is provided for transforming a base multi-tenant cloud into a white labeled cloud of a reseller. A first customer request for a cloud-based service is received by the reseller. Based on a central identification of a customer mapped to a local identification, a second request for the service is sent from the reseller to the cloud provider, indicating the customer is an apparent source of the second request and an apparent customer of the cloud provider, and obscuring the reseller being an actual source of the second request and the customer being an actual customer of the reseller. A customer notification is sent from the reseller, which white labels the provision of the service by indicating the reseller is an apparent provider of the service and obscuring the cloud provider being an actual provider of the service.

19 Claims, 8 Drawing Sheets

(56) References Cited

U.S. PATENT DOCUMENTS

| | | | | |
|---|---|---|---|---|
| 2014/0335501 A1* | 11/2014 | Bahree | .................. | G09B 19/00 |
| | | | | 434/428 |
| 2015/0019402 A1* | 1/2015 | Berlin | .................. | G06Q 40/025 |
| | | | | 705/38 |
| 2015/0227967 A1* | 8/2015 | Knight | .............. | G06Q 30/0246 |
| | | | | 705/14.45 |
| 2015/0372861 A1* | 12/2015 | Stuchberry | ......... | H04L 41/5041 |
| | | | | 370/259 |
| 2016/0283740 A1* | 9/2016 | Roundtree | .......... | G06F 21/6245 |
| 2017/0126777 A1* | 5/2017 | Smith | ..................... | H04L 67/04 |

OTHER PUBLICATIONS

Solutions for Cloud Infrastructure (Iaas) Resellers [online]; [retrieved on Jul. 2, 2014; Retrieved from the Internet URL: <http://privatecloud.gogrid.com/resellers/>; 3 pages.

Shields, Greg; Reselling Cloud Services for Fun & Profit—White Paper; Feb. 19, 2013; N-able Technologies Inc.; 4 pages.

GetCloud Services; Know About White Label Cloud Services [online]; Dec. 11, 2013; [retrieved on Jul. 2, 2014]; Retrieved from the Internet URL: <http://www.getcloudservices.com/blog/know-about-white-label-cloud-services>; 3 pages.

Softlayer; Hosting Solutions—Meet your perfect host for hosting [online] [retrieved on Jul. 3, 2014; Retrieved from the Internet URL: <http://www.softlayer.com/partners/reseller>; 3 pages.

SoftLayer; ZipServers: SoftLayer Customer Success Story [online]; [retrieved on Jul. 3, 2014; Retrieved from the Internet URL: <http://cdn.softlayer.com/ss_zipservers.pdf>; 2 pages.

McIntyre, Joe; IBM Redbooks—IBM SmartCloud: Becoming a Cloud Service Provider; Dec. 12, 2012; 50 pages.

IBM Smart Cloud Enterprise Service Definition [online], Jun. 16, 2013, Issue 1.0, IBM [retrieved on Nov. 12, 2014]. Retrieved from the Internet URL: <http://assets-production.govstore.service.gov.uk/Giii%20Attachments/IBM%20UNITED%20KINGDOM%20LTD/Bids/Archive1/IBM_G_Cloud_III%20V1.1/IBM%20SCE%20-%20Service%20Definition_Final.pdf >, 4 pages.

Cloud Reseller Program Overview [online] [retrieved on Jul. 3,2014]; Retrieved from the Internet URL: <http://www.awesomecloud.com/cloud-reseller-program/>; 2 pages.

ZipServers Cloud Reseller Program [online] [retrieved on Jul. 6, 2014]; Retrieved from the Internet URL: <http://zipservres.com/reseller_web_hosting.php>; 4 pages.

* cited by examiner

US 10,013,709 B2

TRANSFORMING A BASE MULTI-TENANT CLOUD TO A WHITE LABELED RESELLER CLOUD

TECHNICAL FIELD

The present invention relates to managing cloud computing services, and more particularly to transforming a multi-tenant cloud into a white labeled reseller cloud.

BACKGROUND

Cloud providers strategize to load and profit from their standard cloud offerings. White labeling and reselling cloud-based services are recognized as important levers that spur growth in the adoption of cloud computing. Reselling a white-labeled cloud is a force multiplier in terms of revenue generation. In many large world markets, there are laws that prohibit commercial activities by multinational entities, which allow local resellers to be the only route to tap the large domestic customer base. Existing techniques for transforming a public cloud into a service provider cloud are improvised manual implementations that are inefficient, imperfect, labor-intensive, and therefore expensive. In one known technique, a base cloud provider exposes hundreds or thousands of application programming interfaces (APIs) and the guidance to the reseller is a user manual that explains invocation of the APIs. The reseller must write all the code needed to use the APIs to develop a reseller cloud on top of the base cloud. In another known technique, a storefront (i.e., marketplace) is used to white label and resell. Usually there is a well-defined generic interface between the base multi-tenant cloud and the storefront, but because of non-standardized Infrastructure as a Service (IaaS) APIs, the fusion between the base cloud and the storefront is not powerful enough to allow the end customers to exploit all the capabilities of the underlying cloud (e.g., programmability and object storage to end customers), other than the capabilities exposed through the generic interface. For example, the underlying base cloud supports a few hundred APIs, but the end customers are limited because they cannot use those APIs; instead, the end customers can use only the APIs exported by the storefront vendor. Other known techniques provide a method to resell a cloud, but without genuine white labeling (e.g., the host cloud is exposed to the end user when service requests are fulfilled). In the absence of structured guidance with the existing techniques, it is difficult for a reseller to determine if the APIs that are exposed form the necessary and sufficient set for the brand of reselling desired by the reseller.

BRIEF SUMMARY

In a first embodiment, the present invention provides a method of transforming a base multi-tenant cloud into a white labeled cloud of a reseller. The method includes a computer generating a local user identification (ID) of a customer of the reseller. The method further includes based on the local user ID of the customer, the computer generating a central user ID of the customer. The method further includes the computer mapping the local user ID of the customer to the central user ID of the customer. The method further includes the computer receiving from the customer a first request for a provision of a service for the customer by the reseller. The first request indicates the local user ID of the customer. The method further includes based at least in part on the central user ID of the customer being mapped to the local user ID and responsive to the first request, the computer sending a second request from the reseller for a provision of the service for the customer by the provider of the base multi-tenant cloud. The second request indicates to the provider of the base multi-tenant cloud that the customer is an apparent source of the second request and an apparent customer of the provider of the base multi-tenant cloud, and obscures to the provider of the base multi-tenant cloud that the reseller is an actual source of the second request and the customer is an actual customer of the reseller. The method further includes based on a notification address of the customer being based on the central user ID and being accessible to the provider of the base multi-tenant cloud, the computer receiving from the provider of the base multi-tenant cloud a first notification directed to the notification address. The first notification indicates the second request is fulfilled. The method further includes responsive to the first notification being received, the computer sending a second notification from the reseller to the customer via another notification address which is based on the local user ID. The second notification indicates that the service is provided to the customer. The second notification white labels the provision of the service by indicating to the customer that the reseller is an apparent provider of the service to the customer, and by obscuring to the customer that the provider of the base multi-tenant cloud is an actual provider of the service to the customer.

In a second embodiment, the present invention provides a computer system including a central processing unit (CPU); a memory coupled to the CPU; and a computer-readable storage device coupled to the CPU. The storage device includes instructions that are executed by the CPU via the memory to implement a method of transforming a base multi-tenant cloud into a white labeled cloud of a reseller. The method includes the computer system generating a local user identification (ID) of a customer of the reseller. The method further includes based on the local user ID of the customer, the computer system generating a central user ID of the customer. The method further includes the computer system mapping the local user ID of the customer to the central user ID of the customer. The method further includes the computer system receiving from the customer a first request for a provision of a service for the customer by the reseller. The first request indicates the local user ID of the customer. The method further includes based at least in part on the central user ID of the customer being mapped to the local user ID and responsive to the first request, the computer system sending a second request from the reseller for a provision of the service for the customer by the provider of the base multi-tenant cloud. The second request indicates to the provider of the base multi-tenant cloud that the customer is an apparent source of the second request and an apparent customer of the provider of the base multi-tenant cloud, and obscures to the provider of the base multi-tenant cloud that the reseller is an actual source of the second request and the customer is an actual customer of the reseller. The method further includes based on a notification address of the customer being based on the central user ID and being accessible to the provider of the base multi-tenant cloud, the computer system receiving from the provider of the base multi-tenant cloud a first notification directed to the notification address. The first notification indicates the second request is fulfilled. The method further includes responsive to the first notification being received, the computer system sending a second notification from the reseller to the customer via another notification address which is based on the local user ID. The second notification indicates that the service is provided to the customer. The second notification white labels the provision of the service by indicating to the customer that the reseller is an apparent provider of the service to the customer, and by obscuring to the customer that the provider of the base multi-tenant cloud is an actual provider of the service to the customer.

In a third embodiment, the present invention provides a computer program product including a computer-readable storage device and a computer-readable program code stored in the computer-readable storage device. The computer-readable program code includes instructions that are executed by a central processing unit (CPU) of a computer system to implement a method of transforming a base multi-tenant cloud into a white labeled cloud of a reseller. The method includes the computer system generating a local user identification (ID) of a customer of the reseller. The method further includes based on the local user ID of the customer, the computer system generating a central user ID of the customer. The method further includes the computer system mapping the local user ID of the customer to the central user ID of the customer. The method further includes the computer system receiving from the customer a first request for a provision of a service for the customer by the reseller. The first request indicates the local user ID of the customer. The method further includes based at least in part on the central user ID of the customer being mapped to the local user ID and responsive to the first request, the computer system sending a second request from the reseller for a provision of the service for the customer by the provider of the base multi-tenant cloud. The second request indicates to the provider of the base multi-tenant cloud that the customer is an apparent source of the second request and an apparent customer of the provider of the base multi-tenant cloud, and obscures to the provider of the base multi-tenant cloud that the reseller is an actual source of the second request and the customer is an actual customer of the reseller. The method further includes based on a notification address of the customer being based on the central user ID and being accessible to the provider of the base multi-tenant cloud, the computer system receiving from the provider of the base multi-tenant cloud a first notification directed to the notification address. The first notification indicates the second request is fulfilled. The method further includes responsive to the first notification being received, the computer system sending a second notification from the reseller to the customer via another notification address which is based on the local user ID. The second notification indicates that the service is provided to the customer. The second notification white labels the provision of the service by indicating to the customer that the reseller is an apparent provider of the service to the customer, and by obscuring to the customer that the provider of the base multi-tenant cloud is an actual provider of the service to the customer.

Embodiments of the present invention provide a structured approach to non-intrusively transform a public cloud that does not support a service provider context and white labeled services (i.e., a cloud that is built to on-board end customers and not resellers) into a cloud that does support a service provider context and white labeled services.

DETAILED DESCRIPTION

Overview

Embodiments of the present invention provide a structured, algorithmic, non-intrusive approach to transform a base multi-tenant cloud that does not support a service provider context (i.e., reselling cloud-based services) to a white labeled cloud that supports a service provider context by pushing service provider and white labeling logic to layers about the base multi-tenant cloud. A reseller can use the transformed cloud to resell base cloud infrastructure-level services and the associated programmability as a service. The provider of the base cloud provides services to end customers with the impression that there are no resellers. The end customers request and consume cloud-based services with the impression that they have on-boarded a reseller's own cloud offering.

Components in a layer about the base multi-tenant cloud include (1) a custom portal that supports particular service provider roles in addition to the consumer roles supported by the base cloud; (2) a user identification (ID) obfuscation and mapping system; (3) a reseller help desk that interacts with one of the service provider roles in the custom portal; (4) a reseller billing system that interacts with a billing system of the base cloud; (5) a reseller's proxy API server layered about an API service hosted by the base multi-tenant cloud provider; and (6) a customized on-boarding workflow to enroll the reseller's end customers.

Figure 1:
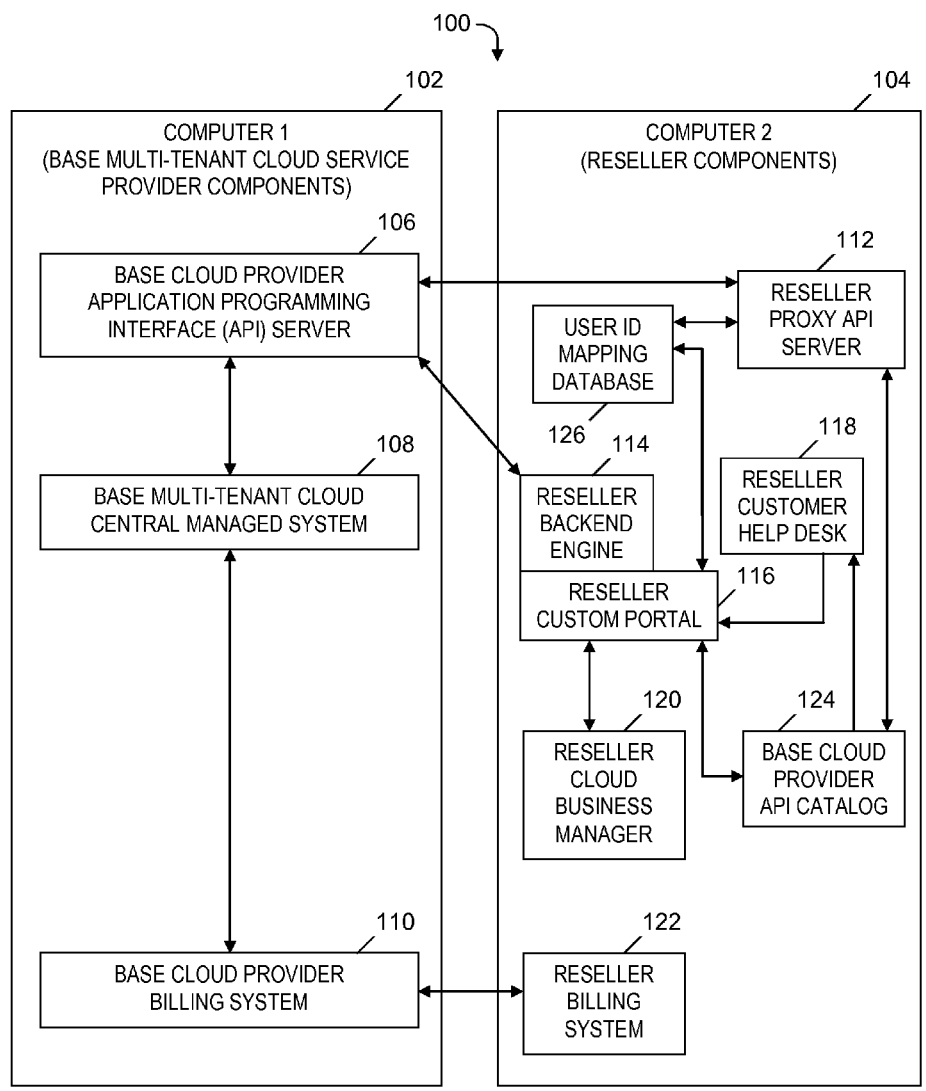
FIG. 1 is a block diagram of a system for transforming a base multi-tenant cloud into a white-labeled reseller cloud, in accordance with embodiments of the present invention.

System for Transforming a Base Multi-Tenant Cloud into a White-Labeled Reseller Cloud FIG. 1 is a block diagram of a system 100 for transforming a base multi-tenant cloud into a white-labeled reseller cloud, in accordance with embodiments of the present invention. System 100 includes a computer 102, which includes components utilized by a provider of a base multi-tenant cloud, and a computer 104, which includes components utilized by a reseller of services of the base multi-tenant cloud. Computer 102 hosts and executes a software-based base cloud provider API server 106, a base multi-tenant cloud central managed system 108, and a base cloud provider billing system 110. Computer 104 executes software-based components, including a reseller proxy API server 112, a reseller backend engine 114 that is accessed via a reseller custom portal 116, a reseller customer help desk 118, a reseller cloud business manager 120, and a reseller billing system 122. Computer 104 includes a base cloud provider API catalog 124 and a user ID mapping database 126.

Reseller custom portal 116 interacting with reseller back-end engine 114 provide the following functions: (1) maps associations of central identifications of customers to local identifications of customers and stores the associations in user ID mapping database 126, which provides user ID obfuscation; (2) supports service provider roles accessed via reseller custom portal 116 for managing accounts and user IDs of customers, managing service requests, managing billing and metering of cloud-based resource consumption by customers, managing on-boarding of customers, and managing reports in a white-labeled fashion; and (3) manages a customized on-boarding workflow to enroll customers of the reseller.

Reseller customer help desk 118 manages customer requests for a service provided by the base multi-tenant cloud to resolve a problem with a cloud-based resource.

Reseller billing system 122 manages metering and billing for consumption of resources of the base multi-tenant cloud by customers of the reseller.

Reseller proxy API server 112 provides local wrappers around respective APIs exported by base cloud provider API server 106 to allow customers to programmatically request consumption of resources of the base multi-tenant cloud without the customer accessing reseller custom portal 116. Reseller proxy API server 112 (1) is instantiated as a white labeled endpoint for access by customers of the reseller; (2) terminates customer invocations of the APIs, where the invocations are included in customer requests; (3) filters the invocations according to policies of the reseller; (4) converts local credentials of the customer included in the invocations to central credentials of the customer which are provided by the provider of the base multi-tenant cloud; (5) fulfills the customer requests by accessing the base cloud provider API server 106. The requests utilize the APIs around which the local wrappers are provided to programmatically request consumption of resources of the base multi-tenant cloud, without the customer accessing reseller custom portal 116.

Although not shown in FIG. 1, system 100 includes a custom on-boarding workflow performed by base multi-tenant cloud central managed system 108 and reseller back-end engine 114.

In one embodiment, the provider of the base multi-tenant cloud is also a customer of the reseller.

The components included in computer 104 (1) specify the minimum API functionality that the provider of the base multi-tenant cloud needs to expose in order to support white labeled resellers and (2) identify the core APIs that the reseller needs to select out of the set of functions exported by the base multi-tenant cloud, in order to build white labeled reseller functionality on top of the base multi-tenant cloud.

The functionality of the components of FIG. 1 is described in more detail in the discussions presented below relative to FIG. 2, FIG. 3, FIGS. 4A-4B, FIG. 5 and FIG. 6.

Figure 2:
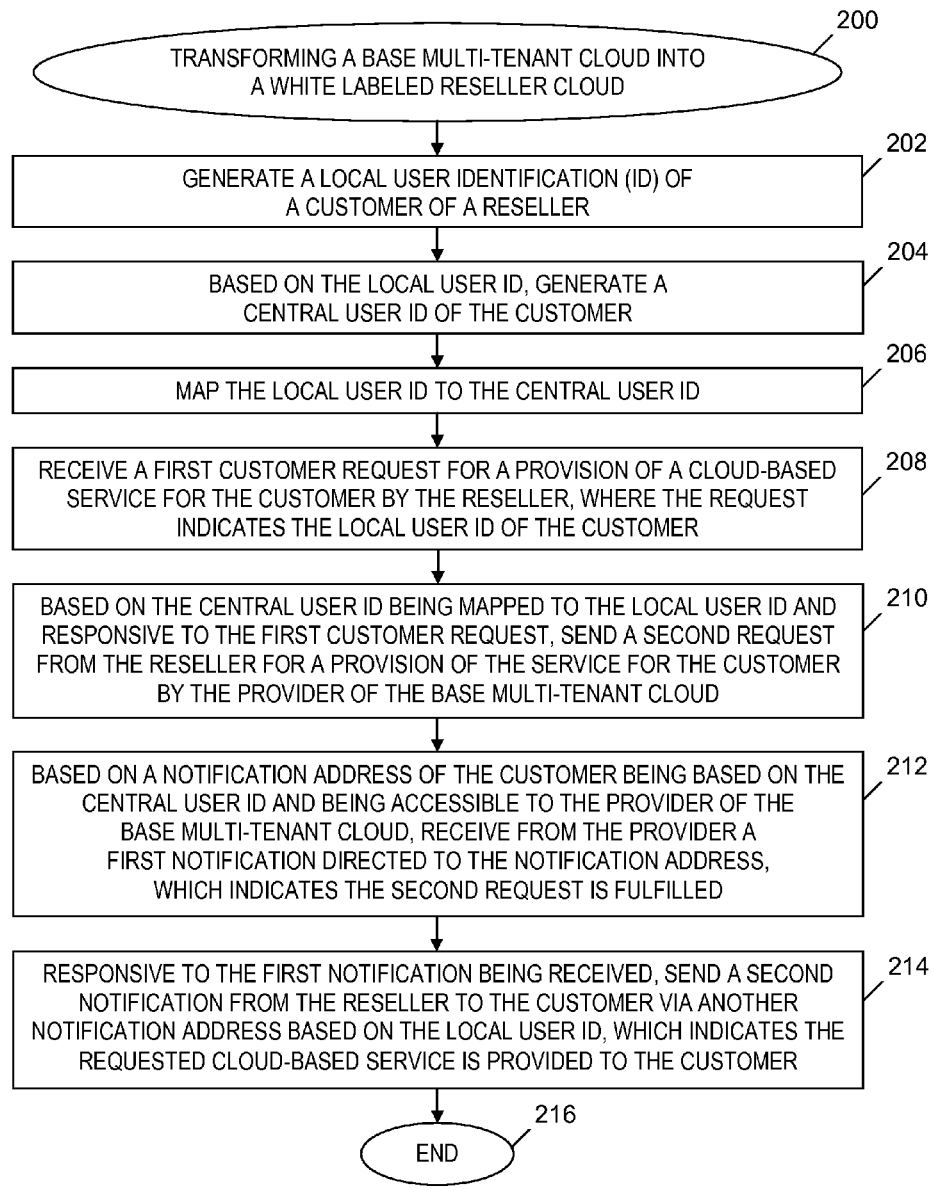
FIG. 2 is a flowchart of a process of transforming a base multi-tenant cloud into a white-labeled reseller cloud, where the process is implemented in the system of FIG. 1, in accordance with embodiments of the present invention.

Process for Transforming a Base Multi-Tenant Cloud into a White-Labeled Reseller Cloud FIG. 2 is a flowchart of a process of transforming a base multi-tenant cloud into a white-labeled reseller cloud, where the process is implemented in the system of FIG. 1, in accordance with embodiments of the present invention. The process of FIG. 2 starts at step 200. In step 202, reseller custom portal 116 (see FIG. 1) generates or receives a local user ID of a customer. In one embodiment, the local user ID is an email address of a user. The local user ID of the customer is not known or accessible by the provider of the base multi-tenant cloud. Furthermore, the customer identified by the local user ID has no knowledge of and cannot directly communicate with or access the provider of the base multi-tenant cloud.

In step 204, based on the local user ID of the customer, reseller custom portal 116 (see FIG. 1) generates a central user ID of the customer. The central user ID is owned by the reseller. In one embodiment, reseller custom portal 116 (see FIG. 1) generates the central user ID by utilizing a two-way function so that a central user ID (e.g., central email address) can be programmatically determined from the local user ID (e.g., local email address) and the local user ID can be programmatically determined from the central user ID.

In a case in which the local user ID is an email address consisting of the following sequence of three parts: a local part, an @ symbol, and a domain part, reseller custom portal 116 (see FIG. 1) generates a local part of a central user ID (i.e., central email address) by concatenating the alphanumeric characters in the local part of the local user ID to the letters "AT," which substitute for the @ symbol, and then to the domain part of the local user ID, with the dot (i.e., period) symbol in the domain part being replaced with the letters "DOT." To generate the central user ID, reseller custom portal 116 (see FIG. 1) concatenates the aforementioned local part of the central user ID, the @ symbol, and the domain name of the reseller. For example, based on the local email address subAccountUser@localCompany. net and the reseller having a domain name of resellerDomain.net, reseller custom portal 116 (see FIG. 1) generates the central email address subAccountUser-ATlocalCompanyDOTnet@resellerDomain.net.

In step 206, reseller custom portal 116 (see FIG. 1) maps the local user ID to the central user ID and stores the mapping between the local user ID and the central user ID in user ID mapping database 126, which is included in a data repository (not shown) coupled to computer 104 (see FIG. 1).

In step 208, reseller custom portal 116 (see FIG. 1) receives a first request from a customer. The first request is a request for a provision of a service of the base multi-tenant cloud for the customer. The customer sends the first request to the reseller to provide the requested service with no knowledge of or access to the provider of the base multi-tenant cloud. The first request indicates the local user ID of the customer, which identifies the initiator of the first request.

In step 210, based at least in part on the central user ID being mapped to the local user ID in step 206, and responsive to the first request being received in step 208, reseller custom portal 116 (see FIG. 1) sends a second request from the reseller to the provider of the base multi-tenant cloud to provide to the customer the aforementioned requested service of the base multi-tenant cloud. The second request indicates the central user ID of the customer. By indicating the central user ID, the second request indicates to the provider of the base multi-tenant cloud that the customer is an apparent source of the second request and an apparent customer of the provider of the base multi-tenant cloud. The second request obscures to the provider of the base multi-tenant cloud that the reseller is an actual source of the second request and the customer is an actual customer of the reseller. The customer is not an actual source of the second request and the customer is not an actual customer of the provider of the base multi-tenant cloud.

In step 212, based on a notification address of the customer which is based on the central user ID, and based on the notification address of the customer being accessible to the provider of the base multi-tenant cloud, reseller custom portal 116 (see FIG. 1) receives a first notification, which is from the provider of the base multi-tenant cloud, and which is directed to the notification address of the customer. The first notification indicates that the second request sent in step 210 is fulfilled by the provider of the base multi-tenant cloud. In one embodiment, the notification address is the same as the central user ID.

In step 214, responsive to the first notification being received in step 212, reseller custom portal 116 (see FIG. 1) sends a second notification from the reseller to the customer via a second notification address, which is based on the local user ID. The second notification indicates the requested service is provided to the customer. The second notification white labels the provision of the requested service by indicating to the customer that the reseller is an apparent provider of the service to the customer, and by obscuring to the customer that the provider of the base multi-tenant cloud is an actual provider of the service to the customer. The reseller is not an actual provider of the service to the customer. In one embodiment, the second notification address is an email address, which is the same as the local user ID. The process of FIG. 2 ends at step 216.

Mapping Credentials

In one embodiment, prior to step 208, reseller backend engine 114 (see FIG. 1) requests base multi-tenant cloud central managed system 108 (see FIG. 1) to generate central credentials of the customer. The central credentials can include a central password. The reseller custom portal 116 (see FIG. 1) receives the central credentials of the customer from base multi-tenant cloud central managed system 108 (see FIG. 1). Reseller custom portal 116 (see FIG. 1) applies a one-way function to the central credentials to generate local credentials of the customer (i.e., locally computed custom portal credentials of the customer). The one-way function is a function whose inversion is computationally infeasible. For example, reseller custom portal 116 (see FIG. 1) utilizes a one-way function to generate a local password of the customer from the central password of the customer. Reseller custom portal 116 (see FIG. 1) maps the local credentials to the central credentials so that the first request received in step 208 indicates the local credentials and the second request sent in step 210 indicates the central credentials, based on the mapping of the local credentials to central credentials. Reseller custom portal 116 (see FIG. 1) populates data repositories used by reseller customer help desk 118 (see FIG. 1) and reseller billing system 122 (see FIG. 1) with the mapped association between the local and central credentials.

In one embodiment, sending the second request in step 210 includes invoking an infrastructure as a service (IaaS) API, which specifies a request for the provision of the service for the customer by the provider of the base multi-tenant cloud. The IaaS API is exposed by the base multi-tenant cloud central managed system 108 (see FIG. 1). The invocation of the IaaS API employs the central credentials and central user ID of the customer, which indicates to the provider of the base multi-tenant cloud that the customer is an apparent source of the second request, and which obscures to the provider of the base multi-tenant cloud that the reseller is an actual source of the second request.

Custom on-Boarding

Figure 3:
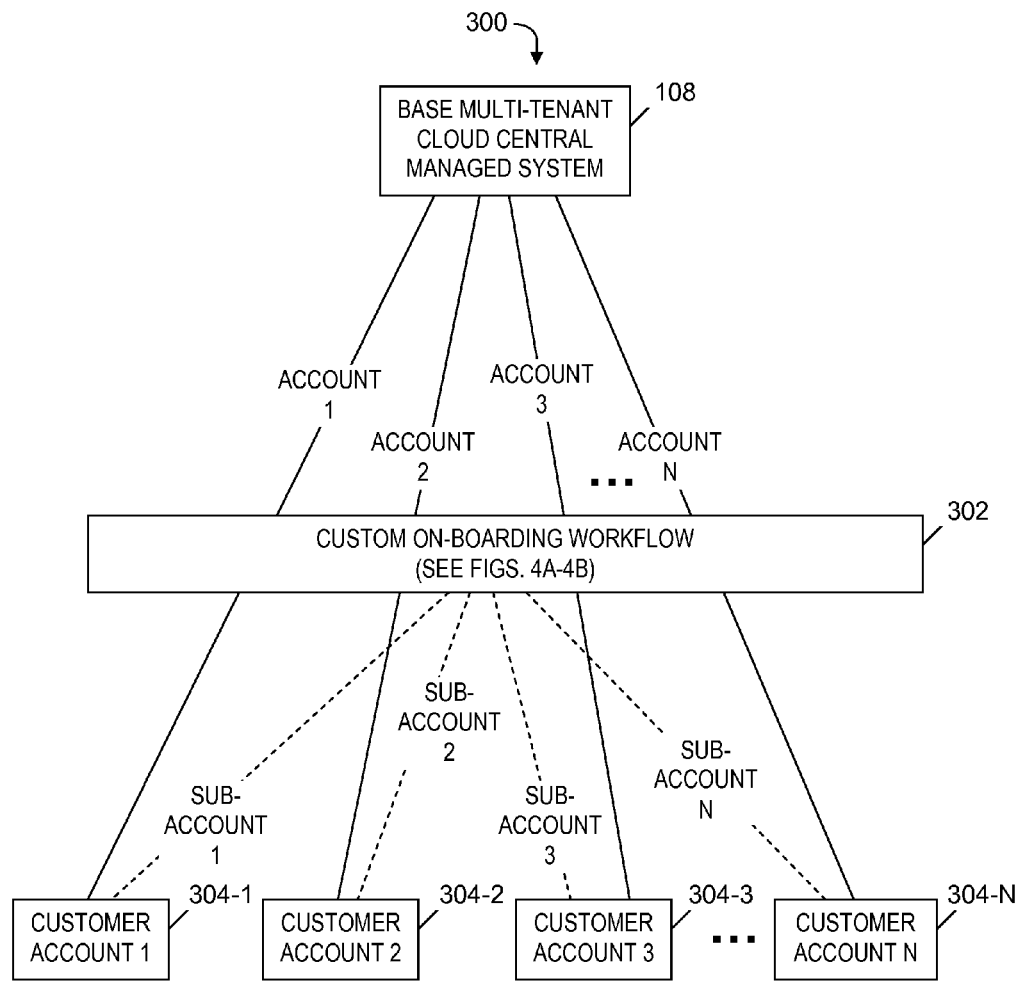
FIG. 3 is a block diagram of a system that implements custom on-boarding by a base multi-tenant cloud management central managed system included in the system of FIG. 1, in accordance with embodiments of the present invention.

FIG. 3 is a block diagram of a system 300 that implements custom on-boarding by a base multi-tenant cloud management central managed system included in the system of FIG. 1, in accordance with embodiments of the present invention. System 300 includes base multi-tenant cloud central managed system 108, which implements a custom on-boarding workflow 302 to on-board N customers having respective customer accounts 304-1, 304-2, 304-3, . . . 304-N. Although customer accounts 304-1, 304-2, 304-3, . . . 304-N in system 300 include at least four customer accounts, so that N≥4, other embodiments include an alternative to system 300 in which there are one or more customer accounts (i.e., N≥1).

The functionality of the components in FIG. 3 is described below in the discussion of FIGS. 4A-4B.

Figure 4A:
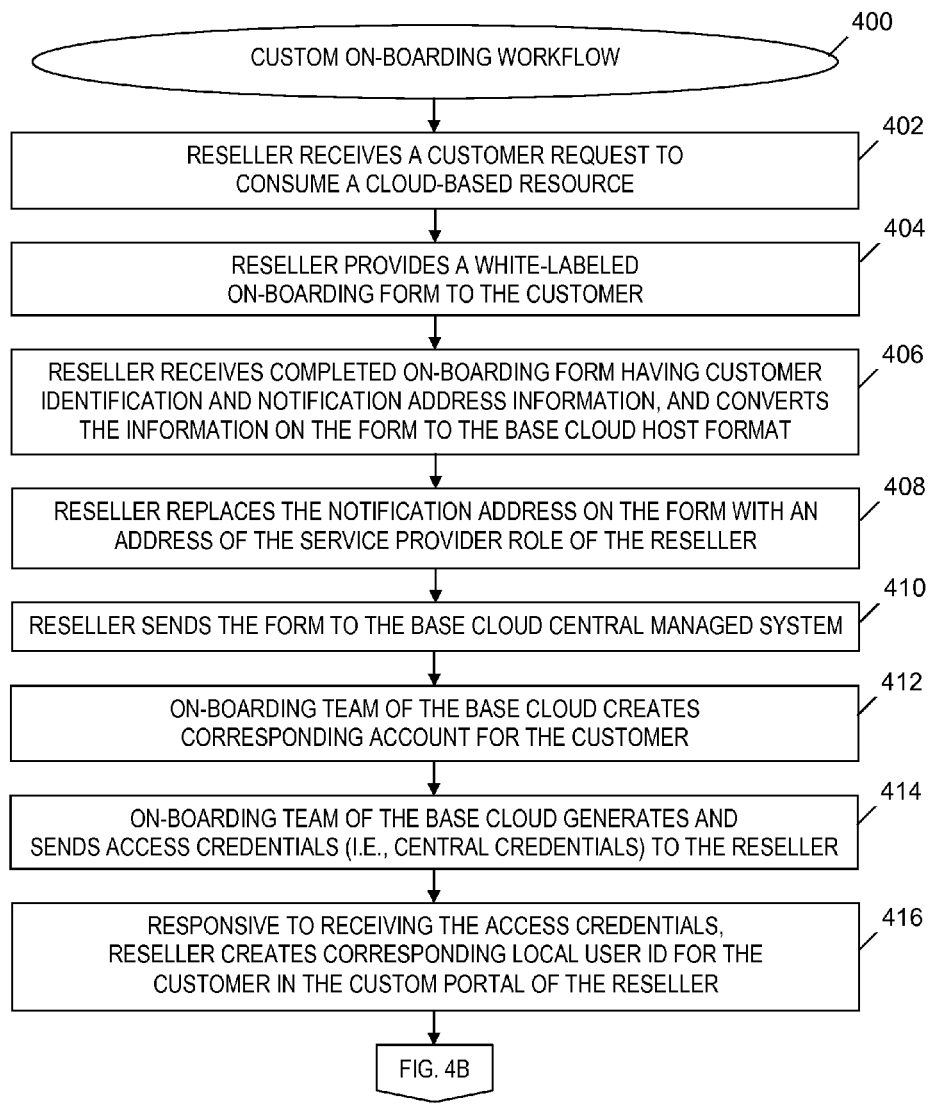
FIGS. 4A-4B depict a flowchart of a custom on-boarding workflow process implemented in the system of FIG. 3, in accordance with embodiments of the present invention.
Figure 4B:
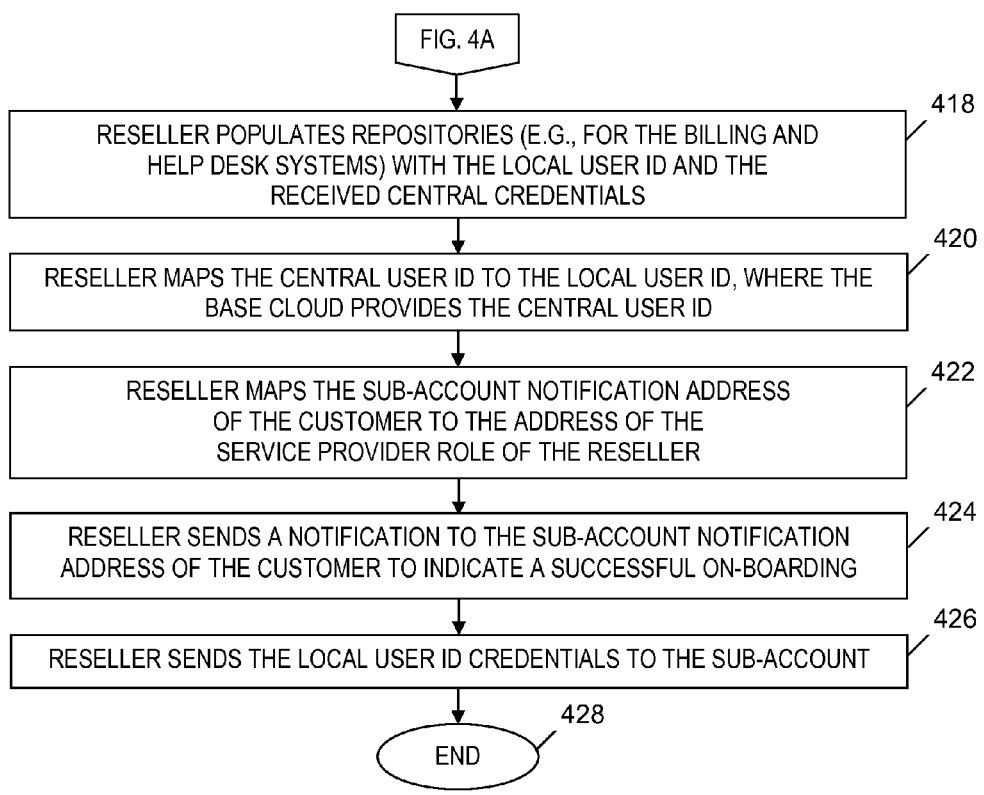

FIGS. 4A-4B depict a flowchart of a custom on-boarding workflow process implemented in the system of FIG. 3, in accordance with embodiments of the present invention. The customer on-boarding workflow process begins at step 400 in FIG. 4A. In step 402, reseller custom portal 116 (see FIG. 1) receives a request from a customer to consume a resource of the base multi-tenant cloud.

In step 404, reseller custom portal 116 (see FIG. 1) provides a white labeled on-boarding form to the customer. The customer completes the on-boarding form by entering information, including customer identification and notification address information.

In step 406, reseller custom portal 116 (see FIG. 1) receives the completed white labeled on-boarding form and converts the information on the on-boarding form to a format compatible with the format of the base multi-tenant cloud.

In step 408, reseller custom portal 116 (see FIG. 1) replaces the notification address on the on-boarding form with an address of the service provider role of the reseller.

In step 410, reseller custom portal 116 (see FIG. 1) sends the on-boarding form to base multi-tenant cloud central managed system 108. The on-boarding form sent in step 410 has the address of the service provider role of the reseller instead of the notification address that had been entered by the customer. An on-boarding team of the base multi-tenant cloud views the on-boarding form via the base multi-tenant cloud central managed system 108.

In step 412, the on-boarding team of the base multi-tenant cloud utilizes base multi-tenant cloud central managed system 108 to create corresponding accounts for respective customers. For example, base multi-tenant cloud central managed system 108 creates customer account 304-1 for a first customer, customer account 304-2 for a second customer, and customer account 304-3 for a third customer.

In step 414, the on-boarding team of the base multi-tenant cloud utilizes base multi-tenant cloud central managed system 108 to generate access credentials (i.e., central credentials) for respective customer accounts 304-1, 304-2, 304-3 . . . 304-N. After generating the access credentials, base multi-tenant cloud central managed system 108 sends the access credentials to reseller custom portal 116 (see FIG. 1). The reseller custom portal 116 (see FIG. 1) stores the access credentials in association with N sub-accounts corresponding to the N customers.

In step 416, responsive to receiving the access credentials sent in step 414, reseller custom portal 116 (see FIG. 1) creates corresponding local user IDs for the sub-accounts of the customers. Following step 416, the process of FIGS. 4A-4B continues with step 418 in FIG. 4B.

In step 418, reseller custom portal 116 (see FIG. 1) populates data repositories for the reseller's billing and help desk systems with the local user IDs created in step 416 and the central credentials generated in step 414 (see FIG. 4A).

In step 420, reseller custom portal 116 (see FIG. 1) maps central user IDs to respective local user IDs and stores the mapping in user ID mapping database 126 (see FIG. 1) in a data repository coupled to computer 104 (see FIG. 1).

In step 422, reseller custom portal 116 (see FIG. 1) maps each notification address of the sub-accounts of the customers to the address of the service provider role of the reseller.

In step 424, reseller custom portal 116 (see FIG. 1) sends a notification to the notification address of each sub-account to indicate a successful on-boarding of each customer.

In step 426, reseller custom portal 116 (see FIG. 1) sends the local user ID credentials to the respective sub-accounts of the customers. The process of FIGS. 4A-4B ends at step 428.

In one embodiment, the customized on-boarding workflow includes the base multi-tenant central managed system 108 (see FIG. 1) creating the account for the customer of the reseller and passing on access credentials of the newly created account to the reseller. Furthermore, the reseller backend engine 114 (see FIG. 1) issues an on-boarding notification and associated credentials to the customer.

Example of Obfuscating User Identifications

As one example, a service provider admin role creates a user (i.e., a customer of a reseller) in a sub-account. The service provider admin role identified by serviceProviderAdmin@localCompany.net logs onto the reseller custom portal 116 (see FIG. 1). The service provider admin role has an associated record in a local data repository which had been added during an initial on-boarding process, which allows the reseller custom portal 116 (see FIG. 1) to access the central credentials of the request-initiating service provider admin role.

The service provider admin role enters the user ID (i.e., email address subAccountUser@localCompany.net) of the user who is to be created. The user ID entered is the local identification of the new user. Base multi-tenant cloud central managed system 108 does not know of or have access to the user ID (i.e., the local identification). The user ID does not have knowledge of or access to base multi-tenant cloud central managed system 108 (see FIG. 1). To achieve the aforementioned lack of knowledge and access, the reseller custom portal 116 (see FIG. 1) generates a corresponding central user ID (i.e., central email address of the customer) subAccountUserATlocalCompanyDOTnet@resellerDomain.net that is owned by the reseller. A two-way function can be used to generate the central user ID. The reseller custom portal 116 (see FIG. 1) generates a local part of a central user ID by concatenating the alphanumeric characters in the local part of the local user ID to the letters "AT," which substitute for the @ symbol, and the domain part of the local user ID, with the dot (i.e., period) symbol in the domain part being replaced with the letters "DOT." To generate the central user ID, reseller custom portal 116 (see FIG. 1) concatenates the aforementioned local part of the central user ID, the @ symbol, and the domain name of the reseller. Because a two-way function is used, it is programmatically possible to determine the central user ID from the local user ID and to determine the local user ID from the central user ID. Reseller custom portal 116 (see FIG. 1) generates and stores a new record in the local data repository coupled to computer 104 (see FIG. 1). The new record associates the local user ID with the central user ID. Reseller backend engine 114 (see FIG. 1) invokes the REST API to create a new user with the mapped central user ID of the requesting admin: serviceProviderAdminATlocalCompanyDOTnet@resellerDomain.net.

After creating the new user, base multi-tenant cloud central managed system 108 (see FIG. 1) generates notification emails. Base multi-tenant cloud central managed system 108 (see FIG. 1) has knowledge of and can communicate with the central user ID of the customer: subAccountUserATlocalCompanyDOTnet@resellerDomain.net, but not the local identification of the customer: subAccountUser@localCompany.net. Base multi-tenant cloud central managed system 108 (see FIG. 1) dispatches the credentials of the newly created user account to subAccountUserATlocalCompanyDOTnet@resellerDomain.net. A mail filter code running in a mail server of the reseller receives the email directed to subAccountUserATlocalCompanyDOTnet@resellerDomain.net and automatically determines that the real destination should be subAccountUser@localCompany.net. The mail filter code cannot automatically forward the notification because the email contains the central credentials of the newly created user. The central credentials need to be mapped to local credentials, and populated in a corresponding record in user ID mapping database 126 (see FIG. 1) in the local data repository. Thus, the mail filter code performs the mapping of the central credentials to the local credentials by utilizing a one-way function which generates a local password from the central password and invokes a utility that inserts the central and local credentials in the record whose local and central user IDs are now known. Reseller custom portal 116 (see FIG. 1) sends the generated local credential to subAccountUser@localCompany.net.

Base multi-tenant cloud central managed system 108 (see FIG. 1) sends a completion notification to the requesting local admin serviceProviderAdmin@localCompany.net. This notification email is received in the mailbox of serviceProviderAdminATlocalCompanyDOTnet@resellerDomain.net which is known by base multi-tenant cloud central managed system 108 (see FIG. 1). Reseller custom portal 116 (see FIG. 1) forwards this notification email to serviceProviderAdmin@localCompany.net.

Incident Ticket Flow

Figure 5:
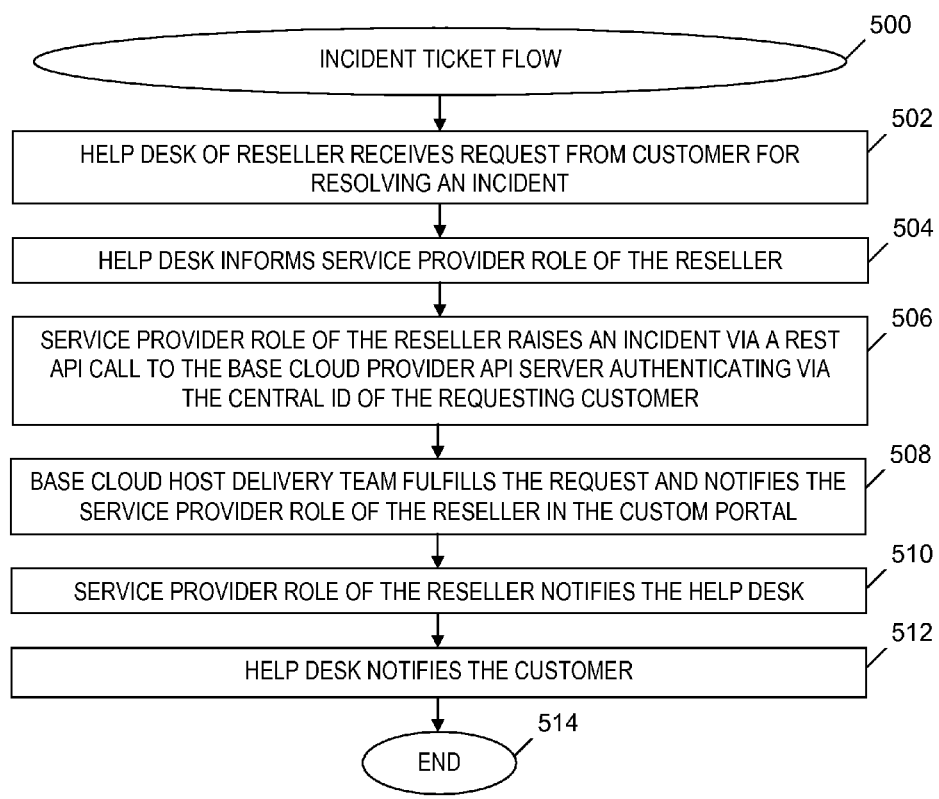
FIG. 5 is a flowchart of an incident ticket flow process implemented by the system of FIG. 1, in accordance with embodiments of the present invention.

FIG. 5 is a flowchart of an incident ticket flow process implemented by the system of FIG. 1, in accordance with embodiments of the present invention. The process of FIG. 5 begins at step 500. In step 502, reseller customer help desk 118 (see FIG. 1) receives a request from a customer for resolving an incident.

In step 504, reseller customer help desk 118 (see FIG. 1) informs a service provider role of the reseller.

In step 506, the service provider role of the reseller raises an incident corresponding to the request via a representational state transfer (REST) API call from reseller backend engine 114 (see FIG. 1) to base cloud provider API server 106 (see FIG. 1). The call is authenticated via the central user ID of the requesting customer.

In step 508, a delivery team of the provider of the base multi-tenant cloud fulfills the request and notifies the service provider role of the reseller by sending a notification of the request fulfillment from base multi-tenant cloud central managed system 108 (see FIG. 1) to reseller backend engine 114 (see FIG. 1).

In step 510, the service provider role of the reseller notifies the help desk of the request fulfillment by sending a notification from reseller backend engine 114 (see FIG. 1) to reseller customer help desk 118 (see FIG. 1).

In step 512, the help desk notifies the customer of the request fulfillment by sending a notification from the reseller customer help desk 118 (see FIG. 1) to the customer via base cloud provider API catalog 124. The process of FIG. 5 ends at step 514.

Billing Workflow

Figure 6:
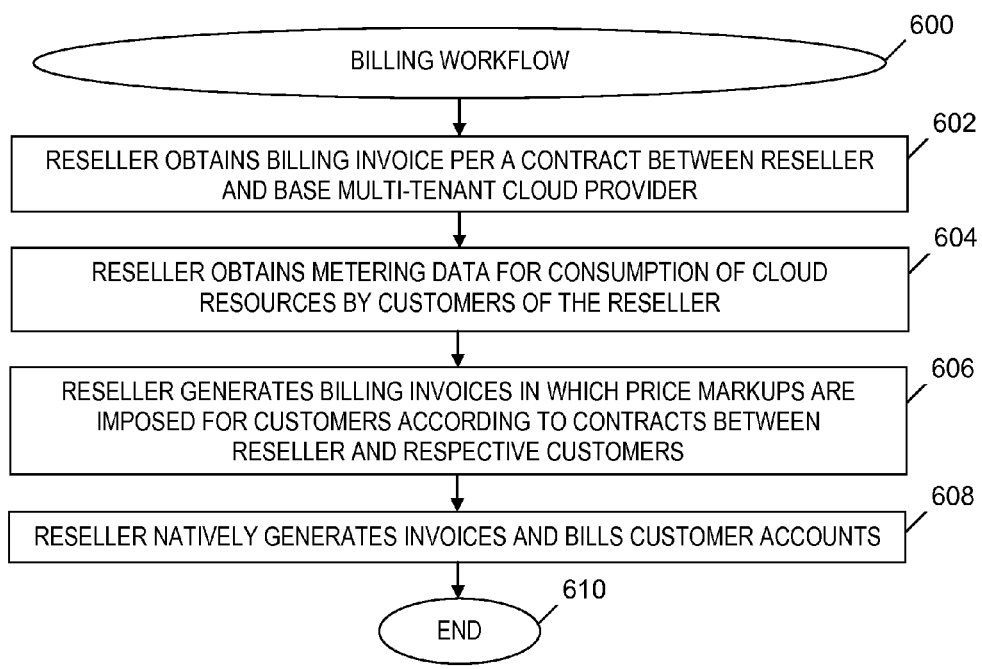
FIG. 6 is a flowchart of a billing workflow process implemented by the system of FIG. 1, in accordance with embodiments of the present invention.

FIG. 6 is a flowchart of a billing workflow process implemented by the system of FIG. 1, in accordance with embodiments of the present invention. The process of FIG. 6 starts at step 600. In step 602, the reseller billing system 122 (see FIG. 1) obtains a billing invoice per an upstream contract between the reseller and the provider of the base multi-tenant cloud.

In step 604, the reseller billing system 122 (see FIG. 1) obtains metering data that measures the consumption of resources of the base multi-tenant cloud by customers of the reseller.

In step 606, the reseller billing system 122 (see FIG. 1) generates billing invoices in which price markups or other price adjustments are impose for customers according to downstream contracts between the reseller and respective customers of the reseller.

In step 608, the reseller billing system 122 (see FIG. 1) natively generates invoices and bills customer accounts. The process of FIG. 6 ends at step 610.

Computer System

Figure 7:
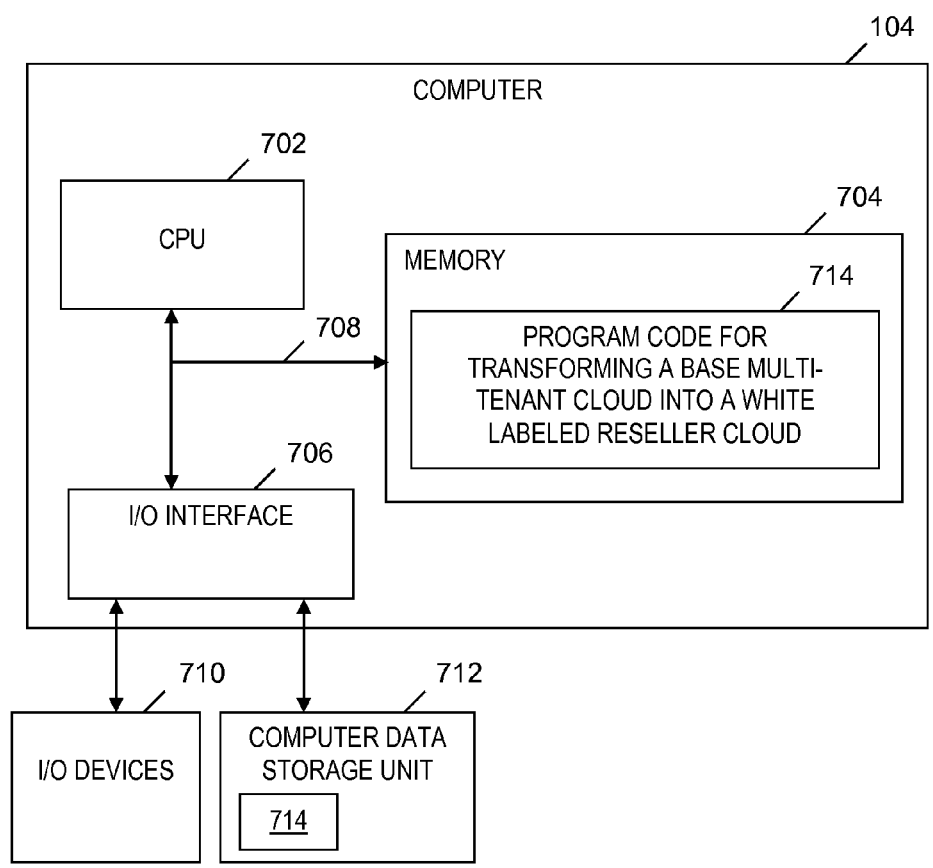
FIG. 7 is a block diagram of a computer that is included in the system of FIG. 1 and that implements the processes of FIG. 2, FIGS. 4A-4B, FIG. 5 and FIG. 6 in accordance with embodiments of the present invention.

FIG. 7 is a block diagram of a computer that is included in the system of FIG. 1 and that implements the processes of FIG. 2, FIGS. 4A-4B, FIG. 5 and FIG. 6 in accordance with embodiments of the present invention. Computer 104 is a computer system or mobile computing device that generally includes a central processing unit (CPU) 702, a memory 704, an input/output (I/O) interface 706, and a bus 708. Further, computer 104 is coupled to I/O devices 710 and a computer data storage unit 712. CPU 702 performs computation and control functions of computer 104, including carrying out instructions included in program code 714 to perform a method of transforming a base multi-tenant cloud into a white labeled reseller cloud, where the instructions are carried out by CPU 702 via memory 704. CPU 702 may include a single processing unit, or be distributed across one or more processing units in one or more locations (e.g., on a client and server). Program code 714 includes program code for the software-based components of computer 104, such as reseller backend engine 114 (see FIG. 1), reseller custom portal 116 (see FIG. 1), reseller customer help desk 118 (see FIG. 1), and reseller billing system 122 (see FIG. 1).

Memory 704 includes a known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, including one or more types of data storage, or be distributed across a plurality of physical systems in various forms. Further, memory 704 can include data distributed across, for example, a local area network (LAN) or a wide area network (WAN).

I/O interface 706 includes any system for exchanging information to or from an external source. I/O devices 710 include any known type of external device, including a display device, keyboard, etc. Bus 708 provides a communication link between each of the components in computer 104, and may include any type of transmission link, including electrical, optical, wireless, etc.

I/O interface 706 also allows computer 104 to store information (e.g., data or program instructions such as program code 714) on and retrieve the information from computer data storage unit 712 or another computer data storage unit (not shown). Computer data storage unit 712 includes a known computer-readable storage medium, which is described below. In one embodiment, computer data storage unit 712 is a non-volatile data storage device, such as a magnetic disk drive (i.e., hard disk drive) or an optical disc drive (e.g., a CD-ROM drive which receives a CD-ROM disk).

Memory 704 and/or storage unit 712 may store computer program code 714 that includes instructions that are carried out by CPU 702 via memory 704 to transform a base multi-tenant cloud into a white labeled reseller cloud. Although FIG. 7 depicts memory 704 as including program code 714, the present invention contemplates embodiments in which memory 704 does not include all of code 714 simultaneously, but instead at one time includes only a portion of code 714.

Further, memory 704 includes an operating system (not shown) and may include other systems not shown in FIG. 7.

Storage unit 712 and/or one or more other computer data storage units (not shown) that are coupled to computer 104 may include user ID mapping database 126 (see FIG. 1) and base cloud provider API catalog 124 (see FIG. 1).

As will be appreciated by one skilled in the art, in a first embodiment, the present invention may be a system; in a second embodiment, the present invention may be a method; and in a third embodiment, the present invention may be a computer program product.

Any of the components of an embodiment of the present invention can be deployed, managed, serviced, etc. by a service provider that offers to deploy or integrate computing infrastructure with respect to transforming a base multi-tenant cloud into a white labeled reseller cloud. Thus, an embodiment of the present invention discloses a process for supporting computer infrastructure, where the process includes providing at least one support service for at least one of integrating, hosting, maintaining and deploying computer-readable code (e.g., program code 714) in a computer system (e.g., computer 104) including one or more processors (e.g., CPU 702), wherein the processor(s) carry out instructions contained in the code causing the computer system to transform a base multi-tenant cloud into a white labeled reseller cloud. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of transforming a base multi-tenant cloud into a white labeled reseller cloud.

While it is understood that program code 714 for transforming a base multi-tenant cloud into a white labeled reseller cloud may be deployed by manually loading directly in client, server and proxy computers (not shown) via loading a computer-readable storage medium (e.g., computer data storage unit 712), program code 714 may also be automatically or semi-automatically deployed into computer 104 by sending program code 714 to a central server or a group of central servers. Program code 714 is then downloaded into client computers (e.g., computer 104) that will execute program code 714. Alternatively, program code 714 is sent directly to the client computer via e-mail. Program code 714 is then either detached to a directory on the client computer or loaded into a directory on the client computer by a button on the e-mail that executes a program that detaches program code 714 into a directory. Another alternative is to send program code 714 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 714 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of transforming a base multi-tenant cloud into a white labeled reseller cloud. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 704 and computer data storage unit 712) having computer readable program instructions 714 thereon for causing a processor (e.g., CPU 702) to carry out aspects of the present invention.

The computer readable storage medium (i.e., computer readable storage device) can be a tangible device that can retain and store instructions (e.g., program code 714) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium and a computer readable storage device, as used herein, are not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 714) described herein can be downloaded to respective computing/processing devices (e.g., computer 104) from a computer readable storage medium or to an external computer or external storage device (e.g., computer data storage unit 712) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 714) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2, FIGS. 4A-4B, FIG. 5 and FIG. 6) and/or block diagrams (e.g., FIG. 1 and FIG. 7) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 714).

These computer readable program instructions may be provided to a processor (e.g., CPU 702) of a general purpose computer, special purpose computer, or other programmable data processing apparatus (e.g., computer 104) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 712) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 714) may also be loaded onto a computer (e.g. computer 104), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of transforming a base multi-tenant cloud into a white labeled cloud of a reseller, the method comprising the steps of:

a computer generating a local user identification (ID) of a customer of the reseller;

based on the local user ID of the customer, the computer generating a central user ID of the customer;

the computer mapping the local user ID of the customer to the central user ID of the customer;

the computer receiving from the customer a first request for a provision of a service for the customer by the reseller, the first request indicating the local user ID of the customer;

based at least in part on the central user ID of the customer being mapped to the local user ID and responsive to the first request, the computer sending a second request from the reseller for a provision of the service for the customer by the provider of the base multi-tenant cloud, which indicates to the provider of the base multi-tenant cloud that the customer is an apparent source of the second request and an apparent customer of the provider of the base multi-tenant cloud, and which obscures to the provider of the base multi-tenant cloud that the reseller is an actual source of the second request and the customer is an actual customer of the reseller;

based on a notification address of the customer being based on the central user ID and being accessible to the provider of the base multi-tenant cloud, the computer receiving from the provider of the base multi-tenant cloud a first notification directed to the notification address, the first notification indicating the second request is fulfilled; and responsive to the first notification being received, the computer sending a second notification from the reseller to the customer via another notification address which is based on the local user ID, the second notification indicating that the service is provided to the customer, which white labels the provision of the service by indicating to the customer that the reseller is an apparent provider of the service to the customer, and by obscuring to the customer that the provider of the base multi-tenant cloud is an actual provider of the service to the customer;

the computer receiving a request from the customer to consume a cloud-based resource;

the computer sending a white labeled on-boarding form to the customer;

the computer receiving the white labeled on-boarding form which includes information entered by the customer, which includes an address of an administrator of the customer;

the computer converting the information included in the on-boarding form to a host format of the base multi-tenant cloud;

the computer replacing on the on-boarding form the address of the administrator with an address of a service provider role of the reseller;

the computer mapping an association between the address of the administrator and the address of the service provider role;

the computer storing the mapped association; and the computer sending the converted information included in the on-boarding form and the address of the service provider role to an on-boarding system of the base multi-tenant cloud.

2. The method of claim 1, further comprising the steps of:

the computer receiving a central password of the customer provided by the provider of the base multi-tenant cloud;

based on a one-way function whose inversion is computationally infeasible, the computer generating a local password of the customer from the central password of the customer; and the computer mapping the local password of the customer to the central password of the customer, wherein the step of receiving the first request includes receiving the first request indicating the local password of the customer, wherein the step of sending the second request includes sending the second request which indicates the central password, based in part on the local password being mapped to the central password.

3. The method of claim 2, wherein the step of sending the second request includes the computer invoking an infrastructure as a service (IaaS) application programming interface (API) which specifies the second request for the provision of the service for the customer by the provider of the base multi-tenant cloud, the IaaS API being exposed by the base multi-tenant cloud, and which employs the central password and central user ID of the customer, which indicates to the provider of the base multi-tenant cloud that the customer is an apparent source of the second request, and which obscures to the provider of the base multi-tenant cloud that the reseller is an actual source of the second request.

4. The method of claim 1, further comprising the steps of:

the computer receiving a request from the customer for resolving an incident associated with the base multi-tenant cloud;

the computer informing the service provider role of the reseller;

the computer raising the incident to a server computer of the provider of the base multi-tenant cloud via a call by the service provider role to an infrastructure as a service (IaaS) application programming interface (API) exposed by the base multi-tenant cloud;

the service provider role receiving a notification indicating the request for resolving the incident is fulfilled without the customer receiving an indication the request for resolving the incident is fulfilled; and the service provider role notifying a help desk that the request for resolving the incident is fulfilled and subsequently, the help desk notifying the customer that the request for resolving the incident is fulfilled, which indicates to the customer that the reseller has apparently serviced the incident without indicating to the customer that the provider of the base multi-tenant cloud actually serviced the incident.

5. The method of claim 1, further comprising, during an operation of a billing system of the reseller, the steps of:

the computer obtaining a first invoice having a first price directed to the reseller from the provider of the base multi-tenant cloud, in accordance with a first contract between the reseller and the provider of the base multi-tenant cloud;

the computer obtaining metering data for the customer from the base multi-tenant cloud, the metering data indicating an amount of resources of the base multi-tenant cloud consumed by the customer, and the metering data obtained via an application programming interface (API) call to the base multi-tenant cloud;

based in part on the metering data and a second contract between the reseller and the customer, the computer generating a second price by adjusting the first price; and the computer sending a second invoice having the second price to the customer, the second invoice indicating to the customer that the reseller is a source of the second invoice, without identifying the provider of the base multi-tenant cloud to the customer.

6. The method of claim 1, further comprising the step of the computer operating a proxy application programming interface (API) server which provides local wrappers around respective APIs exported by an API server hosted by the base multi-tenant cloud.

7. The method of claim 6, further comprising the steps of:

the computer instantiating the proxy API server as a white labeled endpoint for access by a second request from the customer, which consumes resources of the base multi-tenant cloud programmatically via the APIs around which the local wrappers are provided, without the customer accessing the API server hosted by the base multi-tenant cloud;

the proxy API server terminating invocations of the APIs by the request of the customer;

the proxy API server filtering the invocations according to policies of the reseller;

the proxy API server converting local credentials of the customer included in the invocations to central credentials of the customer which are provided by the provider of the base multi-tenant cloud; and the proxy API server fulfilling the second request by accessing the API server hosted by the base multi-tenant cloud.

8. The method of claim 1, further comprising the steps of:

responsive to the on-boarding system of the base multi-tenant cloud generating an account of the customer and generating central access credentials of the customer, the computer receiving the central access credentials of the customer;

the computer generating local access credentials based on the central access credentials; and the computer sending the local access credentials and a notification of a successful on-boarding of the base multi-tenant cloud to the account of the customer.

9. The method of claim 1, further comprising the computer identifying a proper subset of APIs included in a set of APIs exposed by the base multi-tenant cloud, the APIs in the proper subset providing functionality consisting of (1) a system that maps central identifications of customers to local identifications of customers, (2) a custom portal of the reseller that supports management of accounts and identifications of customers, management of requests for services provided by the base multi-tenant cloud, management of metering and billing for consumption of resources of the base multi-tenant cloud, management of on-boarding the reseller and customers of the reseller to the base multi-tenant cloud, and management of reports generated on a white label basis, (3) a help desk of the reseller, (4) a billing system of the reseller, (5) a proxy API server providing customers with programmatic access to the base multi-tenant cloud via APIs, and (6) a customized on-boarding workflow to on-board customers of the reseller to the base multi-tenant cloud.

10. The method of claim 1, wherein the provider of the base multi-tenant cloud provider is also the customer of the reseller.

11. A computer system comprising:

a central processing unit (CPU);

a memory coupled to the CPU; and a computer-readable storage device coupled to the CPU, the storage device containing instructions that are executed by the CPU via the memory to implement a method of transforming a base multi-tenant cloud into a white labeled cloud of a reseller, the method comprising the steps of:

the computer system generating a local user identification (ID) of a customer of the reseller;

based on the local user ID of the customer, the computer system generating a central user ID of the customer;

the computer system mapping the local user ID of the customer to the central user ID of the customer;

the computer system receiving from the customer a first request for a provision of a service for the customer by the reseller, the first request indicating the local user ID of the customer;

based at least in part on the central user ID of the customer being mapped to the local user ID and responsive to the first request, the computer system sending a second request from the reseller for a provision of the service for the customer by the provider of the base multi-tenant cloud, which indicates to the provider of the base multi-tenant cloud that the customer is an apparent source of the second request and an apparent customer of the provider of the base multi-tenant cloud, and which obscures to the provider of the base multi-tenant cloud that the reseller is an actual source of the second request and the customer is an actual customer of the reseller;

based on a notification address of the customer being based on the central user ID and being accessible to the provider of the base multi-tenant cloud, the computer system receiving from the provider of the base multi-tenant cloud a first notification directed to the notification address, the first notification indicating the second request is fulfilled;

responsive to the first notification being received, the computer system sending a second notification from the reseller to the customer via another notification address which is based on the local user ID, the second notification indicating that the service is provided to the customer, which white labels the provision of the service by indicating to the customer that the reseller is an apparent provider of the service to the customer, and by obscuring to the customer that the provider of the base multi-tenant cloud is an actual provider of the service to the customer;

the computer system receiving a request from the customer to consume a cloud-based resource;

the computer system sending a white labeled on-boarding form to the customer;

the computer system receiving the white labeled on-boarding form which includes information entered by the customer, which includes an address of an administrator of the customer;

the computer system converting the information included in the on-boarding form to a host format of the base multi-tenant cloud;

the computer system replacing on the on-boarding form the address of the administrator with an address of a service provider role of the reseller;

the computer system mapping an association between the address of the administrator and the address of the service provider role;

the computer system storing the mapped association; and the computer system sending the converted information included in the on-boarding form and the address of the service provider role to an on-boarding system of the base multi-tenant cloud.

12. The computer system of claim 11, wherein the method further comprises the steps of:

the computer system receiving a central password of the customer provided by the provider of the base multi-tenant cloud;

based on a one-way function whose inversion is computationally infeasible, the computer system generating a local password of the customer from the central password of the customer; and the computer system mapping the local password of the customer to the central password of the customer, wherein the step of receiving the first request includes receiving the first request indicating the local password of the customer, wherein the step of sending the second request includes sending the second request which indicates the central password, based in part on the local password being mapped to the central password.

13. The computer system of claim 12, wherein the step of sending the second request includes the computer system invoking an infrastructure as a service (IaaS) application programming interface (API) which specifies the second request for the provision of the service for the customer by the provider of the base multi-tenant cloud, the IaaS API being exposed by the base multi-tenant cloud, and which employs the central password and central user ID of the customer, which indicates to the provider of the base multi-tenant cloud that the customer is an apparent source of the second request, and which obscures to the provider of the base multi-tenant cloud that the reseller is an actual source of the second request.

14. The computer system of claim 11, wherein the method further comprises the steps of:

the computer system receiving a request from the customer for resolving an incident associated with the base multi-tenant cloud;

the computer system informing the service provider role of the reseller;

the computer system raising the incident to a server computer system of the provider of the base multi-tenant cloud via a call by the service provider role to an infrastructure as a service (IaaS) application programming interface (API) exposed by the base multi-tenant cloud;

the service provider role receiving a notification indicating the request for resolving the incident is fulfilled without the customer receiving an indication the request for resolving the incident is fulfilled; and the service provider role notifying a help desk that the request for resolving the incident is fulfilled and subsequently, the help desk notifying the customer that the request for resolving the incident is fulfilled, which indicates to the customer that the reseller has apparently serviced the incident without indicating to the customer that the provider of the base multi-tenant cloud actually serviced the incident.

15. The computer system of claim 11, wherein the method further comprises, during an operation of a billing system of the reseller, the steps of:

the computer system obtaining a first invoice having a first price directed to the reseller from the provider of the base multi-tenant cloud, in accordance with a first contract between the reseller and the provider of the base multi-tenant cloud;

the computer system obtaining metering data for the customer from the base multi-tenant cloud, the metering data indicating an amount of resources of the base multi-tenant cloud consumed by the customer, and the metering data obtained via an application programming interface (API) call to the base multi-tenant cloud;

based in part on the metering data and a second contract between the reseller and the customer, the computer system generating a second price by adjusting the first price; and the computer system sending a second invoice having the second price to the customer, the second invoice indicating to the customer that the reseller is a source of the second invoice, without identifying the provider of the base multi-tenant cloud to the customer.

16. A computer program product, comprising:

a computer-readable storage device; and a computer-readable program code stored in the computer-readable storage device, the computer-readable program code containing instructions that are executed by a central processing unit (CPU) of a computer system to implement a method of transforming a base multi-tenant cloud into a white labeled cloud of a reseller, the method comprising the steps of:

the computer system generating a local user identification (ID) of a customer of the reseller;

based on the local user ID of the customer, the computer system generating a central user ID of the customer;

the computer system mapping the local user ID of the customer to the central user ID of the customer;

the computer system receiving from the customer a first request for a provision of a service for the customer by the reseller, the first request indicating the local user ID of the customer;

based at least in part on the central user ID of the customer being mapped to the local user ID and responsive to the first request, the computer system sending a second request from the reseller for a provision of the service for the customer by the provider of the base multi-tenant cloud, which indicates to the provider of the base multi-tenant cloud that the customer is an apparent source of the second request and an apparent customer of the provider of the base multi-tenant cloud, and which obscures to the provider of the base multi-tenant cloud that the reseller is an actual source of the second request and the customer is an actual customer of the reseller;

based on a notification address of the customer being based on the central user ID and being accessible to the provider of the base multi-tenant cloud, the computer system receiving from the provider of the base multi-tenant cloud a first notification directed to the notification address, the first notification indicating the second request is fulfilled;

responsive to the first notification being received, the computer system sending a second notification from the reseller to the customer via another notification address which is based on the local user ID, the second notification indicating that the service is provided to the customer, which white labels the provision of the service by indicating to the customer that the reseller is an apparent provider of the service to the customer, and by obscuring to the customer that the provider of the base multi-tenant cloud is an actual provider of the service to the customer;

the computer system receiving a request from the customer to consume a cloud-based resource;

the computer system sending a white labeled on-boarding form to the customer;

the computer system receiving the white labeled on-boarding form which includes information entered by the customer, which includes an address of an administrator of the customer;

the computer system converting the information included in the on-boarding form to a host format of the base multi-tenant cloud;

the computer system replacing on the on-boarding form the address of the administrator with an address of a service provider role of the reseller;

the computer system mapping an association between the address of the administrator and the address of the service provider role;

the computer system storing the mapped association; and the computer system sending the converted information included in the on-boarding form and the address of the service provider role to an on-boarding system of the base multi-tenant cloud.

17. The computer program product of claim 16, wherein the method further comprises the steps of:

the computer system receiving a central password of the customer provided by the provider of the base multi-tenant cloud;

based on a one-way function whose inversion is computationally infeasible, the computer system generating a local password of the customer from the central password of the customer; and the computer system mapping the local password of the customer to the central password of the customer, wherein the step of receiving the first request includes receiving the first request indicating the local password of the customer, wherein the step of sending the second request includes sending the second request which indicates the central password, based in part on the local password being mapped to the central password.

18. The computer program product of claim 17, wherein the step of sending the second request includes the computer system invoking an infrastructure as a service (IaaS) application programming interface (API) which specifies the second request for the provision of the service for the customer by the provider of the base multi-tenant cloud, the IaaS API being exposed by the base multi-tenant cloud, and which employs the central password and central user ID of the customer, which indicates to the provider of the base multi-tenant cloud that the customer is an apparent source of the second request, and which obscures to the provider of the base multi-tenant cloud that the reseller is an actual source of the second request.

19. The computer program product of claim 16, wherein the method further comprises the steps of:

the computer system receiving a request from the customer for resolving an incident associated with the base multi-tenant cloud;

the computer system informing the service provider role of the reseller;

the computer system raising the incident to a server computer system of the provider of the base multi-tenant cloud via a call by the service provider role to an infrastructure as a service (IaaS) application programming interface (API) exposed by the base multi-tenant cloud;

the service provider role receiving a notification indicating the request for resolving the incident is fulfilled; and the service provider role notifying a help desk that the request for resolving the incident is fulfilled and subsequently, the help desk notifying the customer that the request for resolving the incident is fulfilled, which indicates to the customer that the reseller has apparently serviced the incident without indicating to the customer that the provider of the base multi-tenant cloud actually serviced the incident.

* * * * *